Dec. 15, 1959 N. RESSLER Re. 24,752

METHOD OF ELECTROPHORESIS OF SERUM PROTEINS

Original Filed June 6, 1956

INVENTOR

NEWTON RESSLER

BY Robert A. Sloman.

ATTORNEY

United States Patent Office

Re. 24,752
Reissued Dec. 15, 1959

24,752

METHOD OF ELECTROPHORESIS OF SERUM PROTEINS

Newton Ressler, Livonia, Mich.

Original No. 2,843,540, dated July 15, 1958, Serial No. 589,785, June 6, 1956. Application for reissue May 4, 1959, Serial No. 810,982

1 Claim. (Cl. 204—180)

Matter enclosed in heavy brackets [ ] appears in the original patent but forms no part of this reissue specification; matter printed in italics indicates the additions made by reissue.

This invention relates to an improved method of electrophoresis. Electrophoresis is the movement in an electric field of charged molecules in any substance, such as inorganic ions, proteins such as albumin, enzymes, hemoglobin, carbohydrates, blood serum, etc. As the constituents of a particular mixture each has its own particular charge which differs as to extent and sign, when the mixture in solution is placed in an electric field the respective components will move with different mobilities. While the current is flowing the components move continuously at different speeds and thus separate into different groups.

Such characteristics of different molecules permit the use of an electronic method of separating proteins in different substances, such as in the blood, as these proteins have different mobilities. Such method may be used in separating the different elements in a mixture of ingredients of different mobilities. As the mobilities of most elements are known, the amount of smear obtained will indicate the extent, quantitatively of each protein element.

Various methods of electrophoresis have heretofore been employed. In filter paper electrophoresis there have been attendant difficulties due to convection or diffusion and adsorption of proteins to the paper, with resultant trailing of the respective molecule components, preventing clear definition. Up to 10 to 15 percent of the protein content in the electrophoresis of protein by this method may be lost.

There is another method known as the Tiselius method which utilizes a U tube and the maintaining of a precise temperature control. This method requires expensive equipment and produces no better resolution than filter paper.

A third method of electrophoresis employing solid gels as a medium has been employed. This method is laborious and time consuming; and the resolution obtained leaves much to be desired.

The present method contemplates the use of a fluid film as the medium in the electrophoresis i.e. a medium having a certain degree of rigidity, obtained by using the correct proportion of a gelling agent, such as agar-agar.

Experiment has established that the present process utilizing a liquid film of predetermined rigidity accomplishes a better and more accurate result than heretofore obtained by any of the other methods and media referred to.

The present method provides clearer and better definition and resolution of the individual ions or molecules. There is less trailing with little or no diffusion and no loss by adsorption as in the case where filter paper was used. Convection due to temperature conditions is substantially eliminated.

In accordance with the present method of electrophoresis of serum protein or other mixtures is attained by the use of a rigid, yet fluid film. A buffer solution is employed which may consist of a mixture of sodium phosphate and/or phosphoric acid in solution. The important characteristic of the buffer used in this process is that it will maintain a susbtantially constant hydrogen ion concentration or pH, despite small acid or base additions.

Primarily in providing the film, the buffer solution will have a gelling agent added thereto, such as a correct proportion of agar-agar of approximately one tenth of a gram per 100 cubic centimeters of buffer. This is approximately one tenth of one percent agar-agar by weight.

Agar-agar is preferably employed in the buffer in making the film, however, any other substance may be employed which has a tendency to increase the rigidity of the buffer medium, but is in such quantity as to keep the medium in a liquid form as contrasted with a gel or solid medium.

The consistency of the buffer solution for the film is such that if the same is positioned upon a glass plate and tilted to a small acute angle to the horizontal of approximately 5 degrees, there would be no flow or movement of the solution. Nevertheless the solution is liquid and not a solid and will run freely if tilted to a greater angle.

The apparatus which is employed to conduct the present method is shown in the drawing in which.

The above drawing illustrates one form of apparatus which may be employed in conjunction with the present method. Other apparatus may be employed for carrying out the steps of such method.

Figure 1:
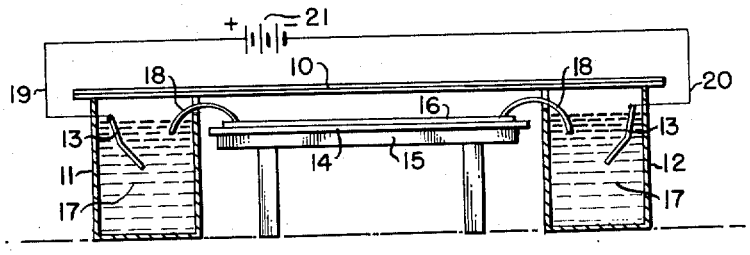
Fig. 1 is a diagrammatic side elevational view of apparatus for performing an electrophoresis.
Figure 2:
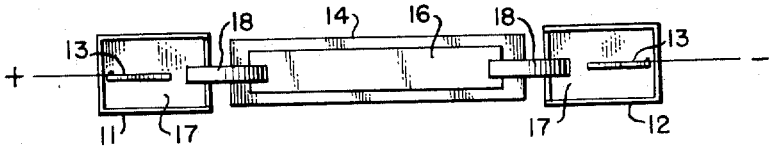
Fig. 2 is a fragmentary plan view thereof.

Referring to the drawing Figures 1 and 2, there are shown a pair of spaced electrode vessels 11 and 12 on a suitable support, both of which contain the buffer solution 17, such as sodium phosphate and/or phosphoric acid in solution.

Platinum or silver electrodes 13 are immersed within the buffer in each vessel and upon the exterior thereof are connected by the wire leads 19 and 20 to a source of direct current 21 having a constant voltage.

Elongated glass plate 14 is supported in a horizontal position upon table 15 and extends between vessels 11 and 12.

As a part of the present method, the elongated film 16 of a rigid but fluid buffer solution is laid down upon glass 14 by means of a pipette throughout substantially its length. The glass plate is approximately two inches wide and ten inches long.

In order to form a stabilized film 16, to the present buffer solution *16—17* there is added approximately 1/10 gram of agar-agar per 100 cubic centimeters of the buffer solution employed.

The film 16 at its ends is connected to the buffer solutions 17 in the electrode vessels 11 and 12 by the filter paper wicks 18, which solutions are at the same level as the film.

Figure 4:
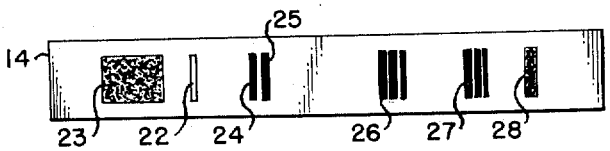
Fig. 4 is a fragmentary view of the dried buffer film when utilizing the present method.

The particular serum to be analyzed, as to protein content for illustration, is then added physically to the film 16 adjacent one end thereof by placing a small piece of filter paper 22, Figure 4, about 10 mm. by 4 mm., which has been soaked in the serum, directly on the film 16 adjacent one end, as in Figure 4.

An additional amount of viscous film 16 may be applied if necessary, so that the film reaches a depth of approximatetly 1/16 of an inch. Before the process is started the surface of the film should be smooth.

If the concentration of agar-agar were increased above the amount used, there would be a decrease in the protein mobility and in the resolution of the different protein elements. It has been found also that the film 16 if containing the high concentration, when dried in the process tends to crack and peel off. If a smaller concentration of agar-agar is employed the resolution again appears to decrease.

A suitable cover 10 is positioned over the entire apparatus and is lined with a wet blotting paper or the like and is tightly sealed over the apparatus in order to prevent evaporation. I have found that using such a cover the film 16 will still be liquid at the end of the run and will not dry out.

Thereafter the electric current is turned on and will flow continuously between the two vessels 11 and 12 and through the film 16 as connected by the saturated filter paper wicks 18.

In the specific test which was conducted 200 volts of D.C. electricity were used at 10 milliamps. The flow of current was continued for a period of four hours, and produced the results shown in Figure 4. This is an advantage over the use of filter paper in electrophoresis which for a suitable separation would have required at least 8 hours, as in Figure 3. The voltage employed should be *at least* in the range 1–6 volts for each centimeter of distance between buffer solutions 17.

Accordingly these are the steps of the present process which utilize the apparatus above described:

(1) A small amount of the migrant is applied to the rigid yet fluid film 16 near one end thereof, such as adjacent the left end, assuming the current is flowing from left to right. Depending upon their charge molecules will move in one direction or the other.

(2) The entire apparatus including the buffer containing vessels and the film with migrant is sealed from the atmosphere to prevent evaporation.

(3) Electric current is applied for approximately four hours, for illustration, during which time molecular components of the migrant will have separated, due to their different and known mobilities upon the application of electric current and due to their individual electric charges.

(4) The current is disconnected and the film is dried such as in an oven by the application of infrared heat. The dried film has formed an invisible protective coating over the separated protein or other components of the migrant as indicated at 23, 24, 25, 26, 27 and 28, Figure 4.

As a velocity of movement under given conditions of each protein, for illustration, in the serum is known, an experienced observer will know and will be able to identify each of the separate groups above numbered 23 through 28. The size of the outline for each of the particular groups will indicate quantitatively the concentration as to each component or molecule in the migrant tested to permit accurate measurement as in Figure 4.

(5) The strip is then stained in any suitable well known fashion as with an alcoholic solution of bromphenol blue.

Thereafter glass plate 14 and its stained film may be inserted in a densitometer and an optical density as to each of the molecular constituents 23 through 28 may be measured and indicated.

Figure 3:
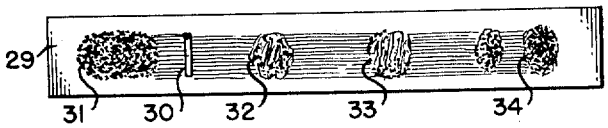
Fig. 3 is a diagrammatic view of a filter paper filter as used in an electrophoresis.

Fig. 3 illustrates the poor type of resolution and lack of definition and the trailing characteristics attained where a buffer saturated filter paper strip 29 is employed as the electrophoresis medium. Here the migrant upon the strip 30 has resulted in the separations 31, 32, 33 and 34. The purpose of Figure 4 as compared with Figure 3 is to indicate the great improvement of definition attained by the present process which employs the rigid but fluid film in this process for the quantitative and qualitative analysis of soluble electrolytes.

By the present method above described it has been found that indications of a greater number of serum protein components can be obtained than with other methods.

While the amount of agar-agar as successfully used in the illustration above was .1% by weight of the buffer solution, this may vary under certain conditions between .07%–.2% by weight.

While the above method as to Figure 4 utilized four hours, the time element may be varied because the extent of separation is directly proportional to the time. The method has been practiced up to 16 hours, and for as short a time as 2½ hours. It is contemplated that the maximum time limit has not been definitely established though it could just as well be 30 hours in extent, and possibly a longer period.

Having described my invention, reference should now be had to the claim which follows.

[1. The method of electrophoresis which consists of separately positioning and spacing a pair of confined buffer solutions, supporting throughout the distance between said solutions and at the same level an elongated liquid film of said buffer solution stabilized by the additioned thereto of a quantity of a gelling agent while retaining its liquidity, said gelling agent being agar-agar, the proportion of which to the buffer solution in the film ranging between .07–.2% by weight, establishing a closed electrical circuit between the buffer solutions and the ends of said film, immersing a small quantity of migrant solution to be analyzed in said film near one end thereof, continuously passing a direct current of approximately 1–6 volts for each centimeter of distance between the buffer solutions, through the said buffer solution and film for a predetermined number of hours, and maintaining throughout a humid air tight atmosphere continuously around said film to prevent evaporation thereof.]

*2. The method of electrophoresis which consists of separately positioning and spacing a pair of confined buffer solutions, supporting throughout the distance between said solutions and at the same level an elongated liquid film of said buffer solution stabilized by the addition thereto of a quantity of gelling agent while retaining its liquidity, said gelling agent being agar-agar, the proportion of which to the buffer solution in the film ranges between .07–.2% by weight, establishing a closed electrical circuit between the buffer solutions and the ends of said film, immersing a small quantity of migrant solution to be analyzed in said film near one end thereof, continuously passing a direct current of at least 1–6 volts for each centimeter of distance between the buffer solutions, through the said buffer solutions and film for a time sufficient to separate the individual constituents of said migrant solution into longitudinally spaced groups respectively, and maintaining a humid air-tight atmosphere continuously around said film to prevent evaporation thereof.*

References Cited in the file of this patent or the original patent

Gordon et al.: "Nature," 1949, 164, pp. 498–499.